(12) United States Patent
Byron et al.

(10) Patent No.: US 10,108,702 B2
(45) Date of Patent: Oct. 23, 2018

(54) TOPIC SHIFT DETECTOR

(71) Applicant: International Business Machines Corporation, Armonk, NY (US)

(72) Inventors: Donna K. Byron, Petersham, MA (US); Barton W. Emanuel, Manassas, VA (US); Samir Mahdad, Algiers (DZ); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 14/833,577

(22) Filed: Aug. 24, 2015

(65) Prior Publication Data

US 2017/0060994 A1 Mar. 2, 2017

(51) Int. Cl.
*G06F 17/30* (2006.01)
*G10L 15/22* (2006.01)
*G10L 15/08* (2006.01)
*G10L 15/18* (2013.01)

(52) U.S. Cl.
CPC .... *G06F 17/30684* (2013.01); *G06F 17/3071* (2013.01); *G10L 15/22* (2013.01); *G10L 15/1822* (2013.01); *G10L 2015/088* (2013.01); *G10L 2015/227* (2013.01)

(58) Field of Classification Search
CPC ............... G06F 17/30684; G10L 15/22; G10L 2015/226
See application file for complete search history.

(56) References Cited

U.S. PATENT DOCUMENTS

| 7,197,460 | B1 | 3/2007 | Gupta et al. |
| 9,582,537 | B1* | 2/2017 | Peddinti ............. G06Q 30/0256 |
| 2007/0118357 | A1* | 5/2007 | Kasravi ................. G06F 17/273 704/10 |
| 2008/0066136 | A1 | 3/2008 | Dorai et al. |

(Continued)

OTHER PUBLICATIONS

National Institute of Standards and Technology, NIST Cloud Computing Program, Information Technology Laboratory, 2010, 2015.

(Continued)

*Primary Examiner* — Grace Park
(74) *Attorney, Agent, or Firm* — Patrick J. Daugherty; Driggs, Hogg, Daugherty & Del Zoppo Co., LPA (57) ABSTRACT

Aspects detect or recognize shifts in topics in computer implemented speech recognition processes as a function of mapping keywords to non-verbal cues. An initial topic is mapped to one or more keywords extracted from a first spoken query within a user keyword ontology mapping. A query spoken subsequent in time to the first query is identified and distinguished by recognizing one or more non-verbal cues associated with the audio data input that include a time elapsed between the queries, and in some aspects a user's facial expression or motion activity. Aspects determine whether the second spoken query is directed to the initial topic or to a new topic that is different from the initial topic, as a function of mappings of the keyword(s) extracted from the first query to one or more keywords extracted from the second query and to the non-verbal cue(s) within the user ontology mapping.

18 Claims, 4 Drawing Sheets

(56) References Cited

U.S. PATENT DOCUMENTS

2009/0077047 A1\* 3/2009 Cooper ............... G06F 17/2785
2014/0149121 A1 5/2014 Di Fabbrizio et al.

OTHER PUBLICATIONS

IBM, Advertising system for electronic chat environments, IP.com Prior Art Database Technical Disclosure, Jun. 21, 2003, IP.com.
IBM et al, Non-verbal Animated Help Screen Function, IP.com Prior Art Database Technical Disclosure, Mar. 21, 2005, IP.com.
Tuan A. Tran, Exploiting Temporal Topic Models in Social Medial Retrieval, L3S Research Center, 2012.

\* cited by examiner

TOPIC SHIFT DETECTOR

BACKGROUND

Computer implemented speech recognition (SR), sometimes referred to as "speech to text" (STT), includes the recognition and translation of audio data inputs into spoken words by applications running (executing) in a computer system environment. Common speech recognition applications include voice user interfaces that enable "voice dialing" by recognizing key words (for example, "Call home") spoken within the audio input and using data associated with the speaker to execute the associated task. Thus, to recognize the speaker (for example, an account holder using a particular cellular phone), look up a telephone number that the user or a contact file indicates is a "home" number of the identified user, and execute a telephone call on the cellular device to the looked-up number.

A variety of approaches are used to successfully detect or recognize and translate audio data inputs into constituent text words or concepts. Some SR systems and applications use "speaker-independent speech recognition," while others use "training" where an individual speaker reads sections of text into an SR system that analyzes the person's specific voice and uses it to fine-tune the recognition of that person's speech, resulting in more accurate transcription.

BRIEF SUMMARY

In one aspect of the present invention, a computer-implemented method detects shifts in topics in computer implemented speech recognition processes as a function of mapping keywords to non-verbal cues. The method includes identifying an initial topic of a first spoken query within an audio data input from a user that is mapped to at least one keyword extracted from the first spoken query within a user keyword ontology mapping. A second spoken query subsequent in time to the first spoken query is identified and distinguished from the first query by recognizing at least one non-verbal cue associated with the audio data input. The at least one non-verbal cue includes a time elapsed between the queries. Thus, aspects determine whether the second spoken query is directed to the initial topic or to a new topic that is different from the initial topic, as a function of mappings of the at least one keyword extracted from the first query to at least one keyword extracted from the second query and to at least one non-verbal cue within the user ontology mapping.

In another aspect, a method provides a service for recognizing shifts in topics in computer implemented speech recognition processes as a function of mapping keywords to non-verbal cues. The method includes integrating computer-readable program code into a computer system including a hardware processor in circuit communication with computer readable memory and a computer readable storage medium. The computer readable program code includes instructions for execution by the processor that cause the processor to identify an initial topic of a first spoken query within an audio data input from a user that is mapped to at least one keyword extracted from the first spoken query within a user keyword ontology mapping. A second spoken query subsequent in time to the first spoken query is identified and distinguished from the first query by recognizing at least one non-verbal cue associated with the audio data input. The at least one non-verbal cue includes a time elapsed between the queries. Thus, aspects determine whether the second spoken query is directed to the initial topic or to a new topic that is different from the initial topic, as a function of mappings of the at least one keyword extracted from the first query to at least one keyword extracted from the second query and to the at least one non-verbal cue within the user ontology mapping.

In another aspect, a system has a hardware processor in circuit communication with a computer readable memory and a computer-readable storage medium having program instructions stored thereon. The processor executes the program instructions stored on the computer-readable storage medium via the computer readable memory and thereby identifies an initial topic of a first spoken query within an audio data input from a user that is mapped to at least one keyword extracted from the first spoken query within a user keyword ontology mapping. A second spoken query subsequent in time to the first spoken query is identified and distinguished from the first query by recognizing at least one non-verbal cue associated with the audio data input. The at least one non-verbal cue includes a time elapsed between the queries. Thus, aspects determine whether the second spoken query is directed to the initial topic or to a new topic that is different from the initial topic, as a function of mappings of the at least one keyword extracted from the first query to at least one keyword extracted from the second query and to the at least one non-verbal cue within the user ontology mapping.

In another aspect, a computer program product for detecting or recognizing shifts in topics in computer implemented speech recognition processes as a function of mapping keywords to non-verbal cues has a computer-readable storage medium with computer readable program code embodied therewith. The computer readable program code includes instructions for execution which cause the processor to identify an initial topic of a first spoken query within an audio data input from a user that is mapped to at least one keyword extracted from the first spoken query within a user keyword ontology mapping. A second spoken query subsequent in time to the first spoken query is identified and distinguished from the first query by recognizing at least one non-verbal cue associated with the audio data input. The at least one non-verbal cue includes a time elapsed between the queries. Thus, aspects determine whether the second spoken query is directed to the initial topic or to a new topic that is different from the initial topic, as a function of mappings of the at least one keyword extracted from the first query to at least one keyword extracted from the second query and to the non-verbal cue within the user ontology mapping.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
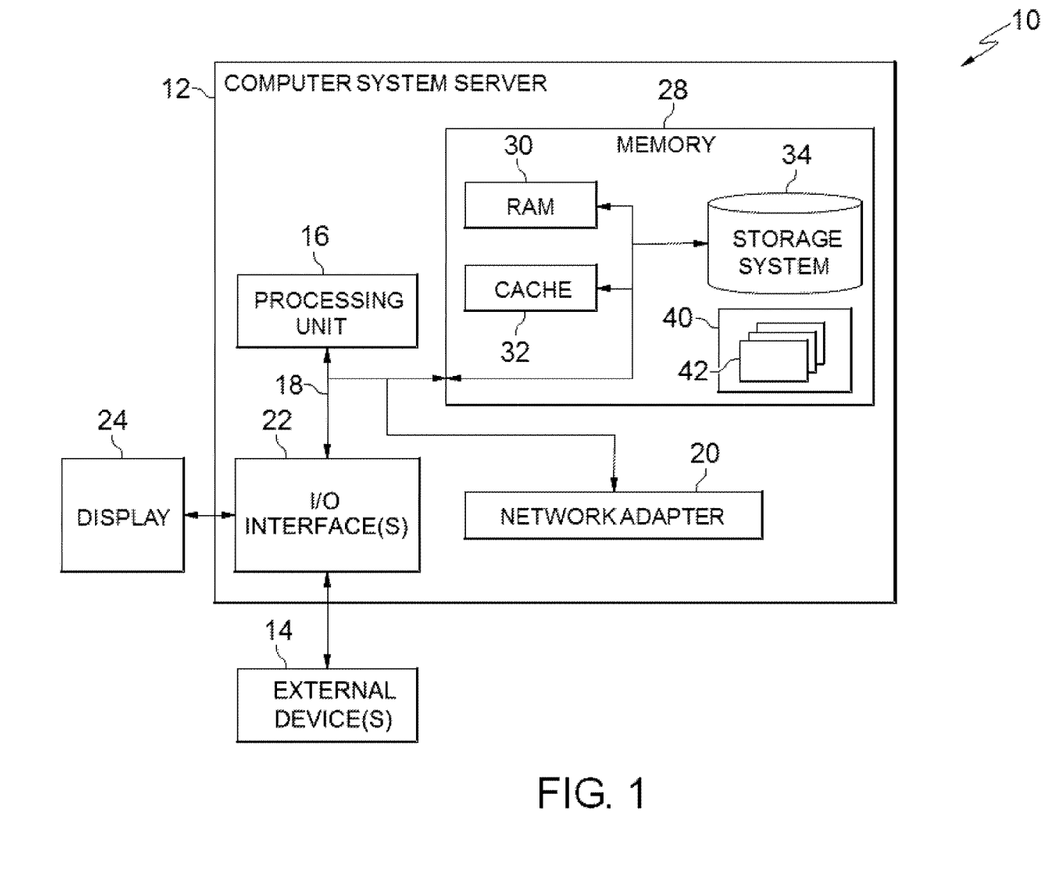
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
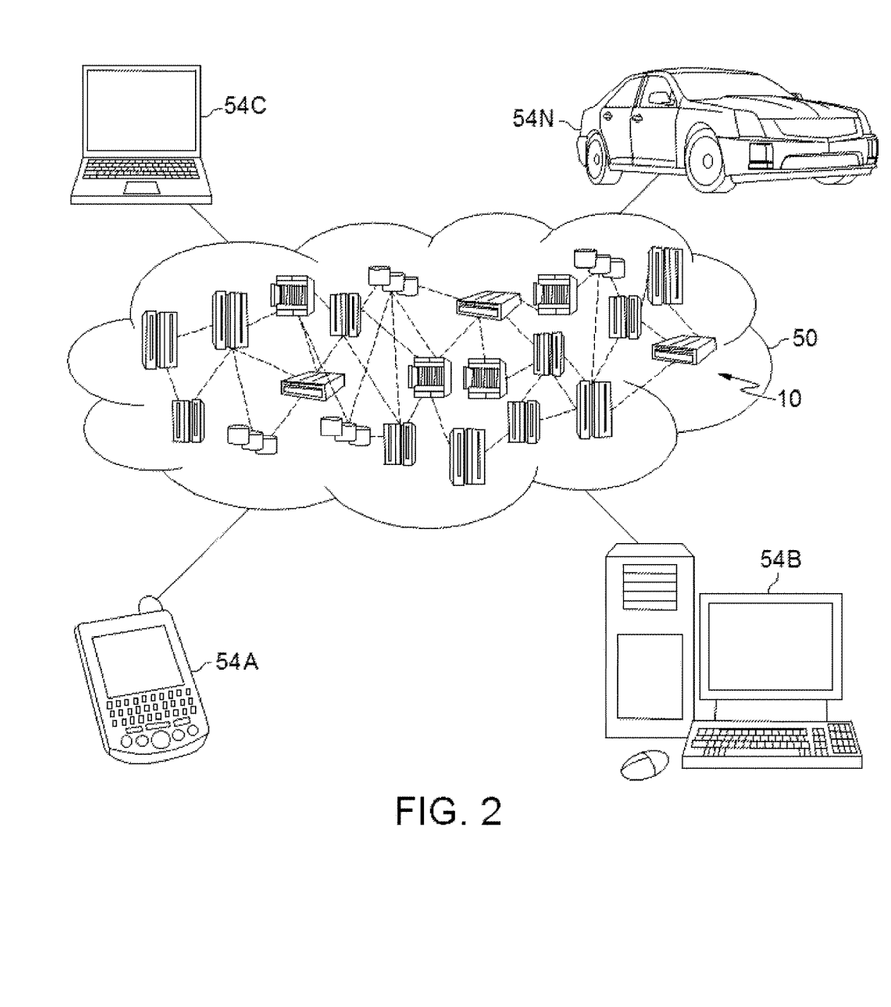
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
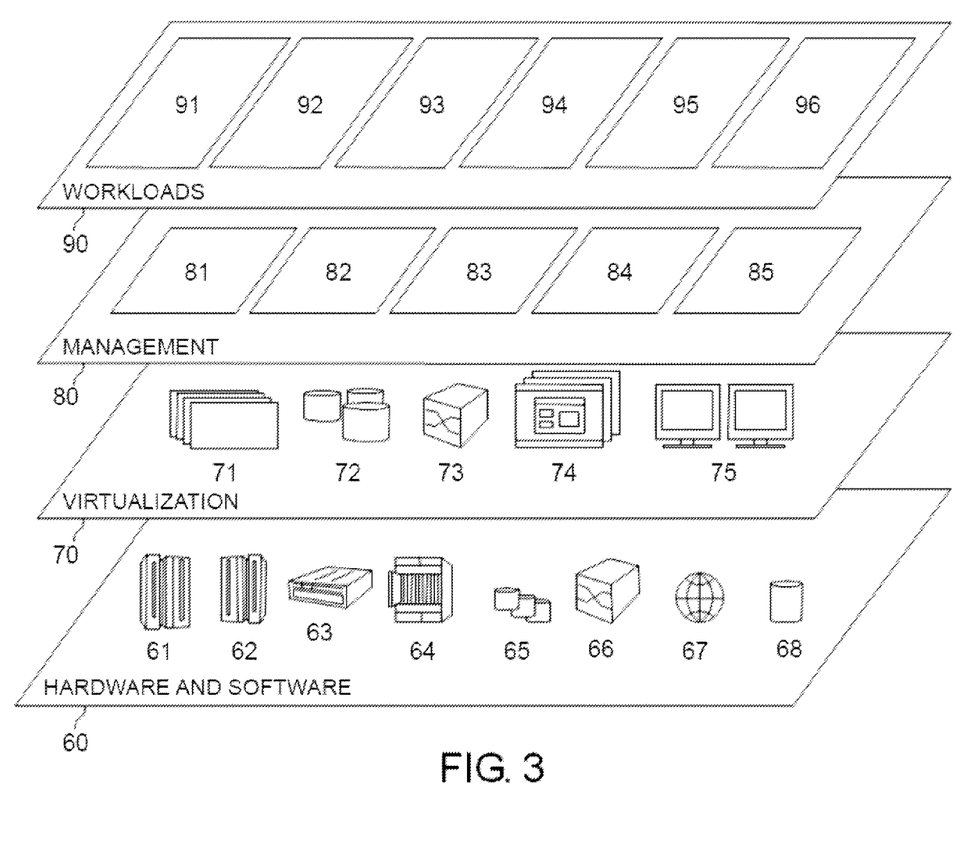
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processes 96 for recognizing shifts in topics in computer implemented speech recognition processes as a function of applying user keyword ontology mapping to non-verbal cues, as discussed with more particularity below.

In one aspect, a service provider may perform process steps of the invention on a subscription, advertising, and/or fee basis. That is, a service provider could offer to integrate computer readable program code into the computer system/server 12 to enable the computer system/server 12 to perform process steps of the invention. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

Figure 4:
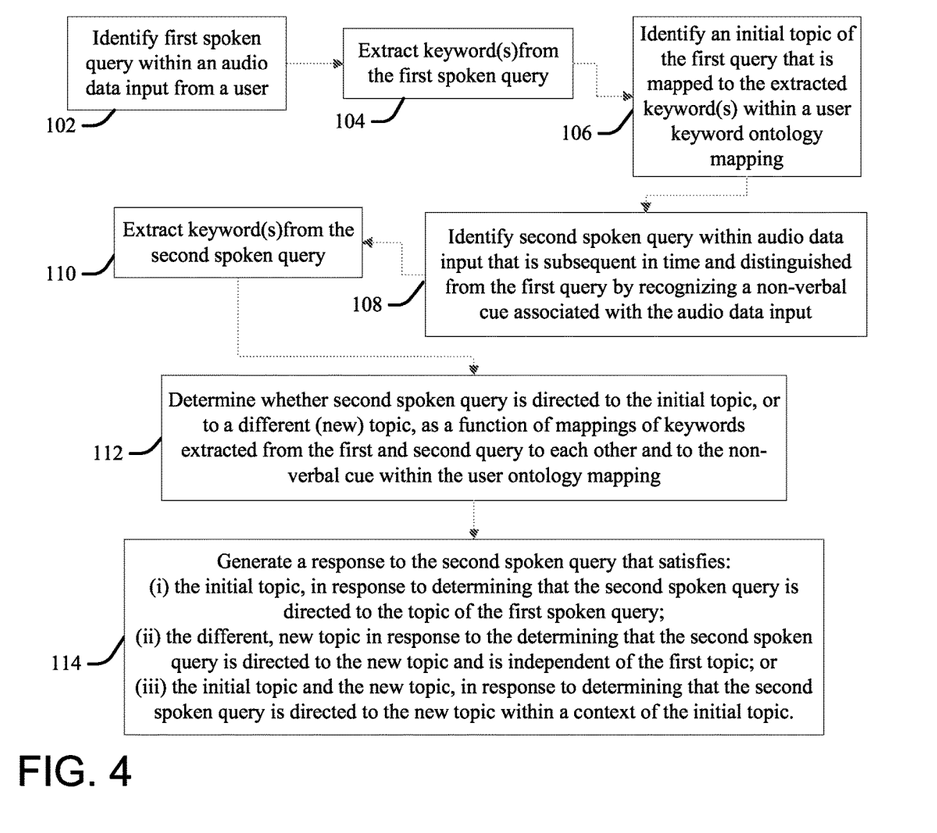
FIG. 4 is a flow chart illustration of a method or process layers for recognizing shifts in topics in computer implemented speech recognition processes as a function of applying user ontology to non-verbal cues according to an embodiment of the present invention.

FIG. 4 (or "FIG. 4") illustrates a computer implemented method or process of an aspect of the present invention wherein a processor (for example, a central processing unit (CPU)) executes code (for example, code installed on a storage device in communication with the processor) and thereby applies a keyword ontology mapping to detect or recognize shifts in topics in computer implemented speech recognition processes as a function of non-verbal cues. As used herein "ontology" refers to a formal naming and definition of types, properties, and/or interrelationships of objects or entities for a particular domain. Aspects of the present invention map or link keywords, related variables, and objects in a keyword ontology mapping structure that establishes or defines relationships between the keywords and non-verbal cues. These mappings are used to improve the accuracy of results returned by automated search applications in satisfaction of user queries that incorporate the mapped keywords. Return of another keyword topic that is mapped to the query keyword and/or a detected non-verbal cue is likely to satisfy the query as a function of the strength of said mapping. The ontology mapping may indicate strengths of association between linked/mapped keywords, objects and non-verbal cues, may also exclude possible links, limiting complexity as well as improve information organization and query satisfaction.

Aspects of the present invention deploy user-defined keyword ontology mappings to provide taxonomies of mapped objects that are useful for one or more specific, computer implemented speech recognition applications. Thus, at 102 a first spoken query is identified within an audio data input from a user. It will be understood that the term "query" as used herein may refer to any question, command, statement, phrase or word that signifies an action that the user wishes the programmable device processor to execute in order to return information in satisfaction of the query.

At 104 one or more keywords are extracted from the first spoken query.

At 106 a topic of the first query is identified as related to (mapped or linked to) the extracted keyword(s) within the keyword ontology mapping.

At 108 a second spoken query is identified within the audio data input from the user that is subsequent in time to the first spoken query and is distinguished from the first query by recognizing a non-verbal cue associated with the audio data input. The non-verbal cue may include: (i) a time elapsed between the first spoken query and the second spoken query; (ii) a user's motion activity relative to a programmable device comprising the processor during a time between the first spoken query and the second spoken query; (iii) a user's facial expression detected or otherwise determined during a time between the first spoken query and the second spoken query; and still others will be apparent to one skilled in the art.

At 110 one or more keywords are extracted from the second spoken query.

At 112 the process determines whether the second spoken query is directed to the same (initial) topic of the first spoken query or to a different (new) topic (thus, whether there is a shift in topic between the queries) as a function of mappings of the keyword(s) extracted from the first and second query to each other and to the non-verbal cue in the user ontology mapping. Determination of commonality or change in topic may be based on a change in category of the respective keywords of the first and second query.

At 114 a response is generated to the second spoken query as a function of user defined keyword ontology mappings for the keyword(s) extracted from the second query to the non-verbal cue, that satisfies: (i) the initial topic, in response to determining that the second spoken query is directed to the same (initial) topic as the first spoken query; (ii) the different, new topic in response to determining that the second spoken query is directed to the different (new) topic and is independent of the first topic; or (iii) the initial topic and the new topic, in response to determining that the second spoken query is directed to the new topic within a context of the initial topic.

Recognition of a dialog break in speech-to-text settings is a non-trivial subject, to define and execute processes that automatically detect or recognize a dialog break or when a user changes a topic, category or subject of query inputs. For example, a user might temporarily change the subject of a topic of the first query to a new topic for the second query, and then go back to the original topic subject for a subsequent third query, or continue to pursue the new topic subject and not go back to the initial topic subject. Generating an appropriate response to any of these queries may depend on correctly determining the topics of each.

Aspects of the present invention determine whether the topic of the second query is the same as, or represents a shift to a new topic, relative to the first query, by using extra-linguistic (non-verbal) context to understand a particular user input. As noted above at 108, the non-verbal cue considered in aspects of the present invention may include a time elapsed between the first spoken query and the second spoken query. A time elapsed between the first and second spoken queries in excess of a threshold time period for topic continuity may not only indicate at 108 that they are different queries, but also a likelihood that the topic has shifted at 112, that the original topic is now stale and likely no longer of interest to the user for providing context to the second query topic at 114, so that the second query topic is considered independent of the first query topic. The amount of elapsed time may also indicate an amount of confidence of a break in topic between the queries, with confidence factor values determined in proportion to the amount of time elapsed between queries.

Assertion of a specific command phrase or keyword within the second query may also be detected or recognized and mapped to specific topic actions or classifications in the user ontology, including a change to a new, independent topic or query. For example, the phrases "let's change the subject," "cancel that," or "new topic," etc., may each be mapped to a change in topic action or classification in a user keyword ontology mapping.

A command or keyword may be mapped to an indication that the topic of the first query provides context for the second. For example, the phrase "what is the weather there?" in the context of a topic of a previous query of a route destination determination, may be mapped to the destination result for the previous query of a route destination determination. This results in generating a query result that returns a current weather forecast for said destination, as a function of a mapping to "there" as a keyword that signifies that the topic of the previous query provides context for the second query, connecting the two queries in a dependent fashion.

Determining a topic or task of the spoken queries, or whether the topic or task of the second query of deviates from the task/topic of the first, may be based on identifying within the keyword ontology mapping relationships among keywords extracted from the queries, or determining category topics of the keywords. The following is a sample dialog between a user and an automated system in an automotive setting that includes different first and second queries:

User first query: "I want to find a vegan restaurant."
System: "In your present location or at your destination?"
User: "Let's say at the destination."
System: "Ok, we have the following options [a list of options is displayed on a display screen or recited to the user in an audio output]."
User: "I'll take the first."
User second query: "What's the weather like?"

In this example, the keywords "find" and "restaurant" are extracted from the first query, and ontology mappings result in categorizing the query as a restaurant search topic, which may be satisfied by searching restaurant database for hits for other text items within the query, namely "vegan" as a food-type sub category. The second query may be categorized as a weather condition or forecast query, and represent a change to a new, independent topic, for example, satisfied by searching for current weather at a current location of the user.

An elapsed time between the two queries that is shorter than a contextual continuity time value defined by the user keyword ontology mapping may indicate that the topic of the first provides context to the different topic of the second, so that a response to the second query also satisfies a context of the first query, or satisfies both topics. For example, the satisfaction of the second query may require a "current weather" response for the location of a vegan restaurant that satisfies the first query.

Non-verbal cues utilized by aspects include user's motion activity relative to the programmable device comprising the processor during a time between the first spoken query and the second spoken query. Such activity may include movement of the device compelled by the user relative to a geographic reference point of a result that satisfies the first spoken query. For example, the device may be a navigational unit located in an automobile, and the compelled motion may be driving the automobile near an address, associated landmark (for example, exit ramp for access thereto, etc.) or other geographic reference point of a restaurant that satisfies a current, pending query for "find food." This geographic reference point is relevant to a keyword extracted from the pending query, but is not relevant to any extracted keywords from a previous query (for example, for current weather), which indicates that the second (current, pending) query is a break in topic or context from the earlier query. Other driving parameters (speed, turns, etc.) may also be used to indicate motion away from progressing toward possible satisfactory results of the earlier query, indicating a break in topic or a new query for new results.

Movement of the user relative to the device may comprehend posture or direction of gaze relative to the device. For example, detecting (via a vehicle camera device, by attenuation in sound received from a microphone) head position of the user to determine that the user has turned away an initial orientation toward the device inputs during the first query and is instead now facing in an alternative orientation (for example, toward other passengers in the rear seat turns) may cause the process to indicate a likelihood that the audio input form the user is a new query or a change in topic from a previous query.

The user's facial expressions may be determined and used to indicate a change in topic or a new query, or a dependent relation of the different topics within ontology mapping. Thus, a camera of the device may scan the user's face and determine an expression of displeasure (for example, a frown, scowl, grimace, etc.), which may be indicative of a likelihood of displeasure with a previous query or response thereto, increasing the likelihood (in view of the user ontology mapping) that a subsequent query is a new query drawn to a new topic independent of the topic of a previous query, that the user has abandoned the topic of the previous query. Alternatively, determining that the user's face displays an expression of pleasure may be indicative of a likelihood of satisfaction with a response to a previous (first) query, increasing the likelihood that a subsequent (second) query drawn to a new topic is meant to modify and refine the first query response, and thus the aspect generates a response to the second spoken query as a function of applying the user keyword ontology mapping to the new topic within a modifying context of the initial topic.

Multiple non-verbal cue factor values may be observed and combined to determine overall confidence factor values that are indicative of whether a topic change has occurred between queries, and if so as to whether one topic provides context for the other (should be considered with the other). Such confidence factor values may be compared to thresholds, to determine that a topic change has happened when the thresholds are met.

Aspects of the present invention detect or recognize new queries, topic shifts, and contextual relations by mapping prior search activity to selections from offered results in keyword ontology mappings. For example, the user ontology may include recent queries regarding routing, accommodations, and attractions at a destination of a trip planned for next week. Thus, the ontology mapping may indicate that it is likely that a satisfactory response to the query for a vegan restaurant above may be one that is most proximate to the trip destination, resulting in presenting a list of results ranked by proximity to the destination. Else, the ontology mapping may indicate that the present query is independent from (is not related to or mapped to) the previous ontology activity, and search for vegan restaurants instead close to a current or default location (for example, home, office, etc.)

Users may configure keyword ontology mappings with personalized attribute or dimension mappings. Illustrative but not limiting or exhaustive dimension examples include time dimensions (when), geographic dimension (where), environment dimensions (for example, weather, day or night time, etc.), and still others will be apparent to one skilled in the art. Thus, in response to a query about a restaurant from a user, the keyword ontology mapping of the user may include default timing, location, and weather parameter values for ranking or returning results, for example defaulting to returning restaurant results ranked as a function of having evening hours and outdoor patios (when the weather dimension inputs at each result is not precipitating rain or snow or experiencing temperatures below sixty degrees Fahrenheit), and further in order of proximity to a home location of the user. Other mapped ontology dimensions may generate rankings of results by average peer ratings, or wine selection, and still others will be apparent to one skilled in the art. Such personalized ontologies can be created based on user's manual input, or via self-learning mechanisms that track user's historical selections.

Historical analysis of user's queries may also be used to detect or recognize and extract keywords for mapping within the keyword ontology, with frequently selected results and topics of previous queries identified and extracted as keywords from future queries to be compared to the (or processed as a function of) the ontology mappings. Thus, aspects may perform contextual analysis of the queries and subject topics in order to extract keywords.

Historical analysis may also define association rules for the ontology mappings, to establish contextual relationships among the identified keywords, for example "restaurant" with "weather." Once relationships among keywords are mapped, aspects may readily identify categories of the identified related keywords: for example, once "restaurant" is searched, the system may then prompt the user for time, location, weather inputs, or retrieve most frequent or last inputs from the user ontology mapping data. In this respect, each keyword or category may function as a dimension or context for retrieving results in satisfaction of user queries. Once a keyword is identified from a query/subject, based on ontology mappings the aspects may classify the category of the keyword and also identify related categories.

Aspects may analyze and match keywords or other attributes of a current, new (second) query, including facial expressions, body languages and movements of the user associated with the current query, against different dimensions of the keyword ontology mapping that are learned to be frequently associated with an immediately previous (first) query. These dimensions may also be used to identify and categorize the queries. Accordingly, if the dimensions of a current (second) query do not match the dimensions learned to be associated with the first query, the aspects indicate an increased likelihood that the second query represents a topic break from the first query. A value of difference or distance between the mapped dimensions of the first and second queries may be used to set a strength of context provided by the first topic to the second topic, wherein the greater the difference or distance, the less effect of the context of the topic of the first query will have on retrieving results in satisfaction of the second query.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting shifts in topics in computer implemented speech recognition processes as a function of mapping keywords to non-verbal cues, the method comprising executing on a computer processor:

identifying an initial topic of a first spoken query within an audio data input from a user that is mapped to at least one keyword extracted from the first spoken query within a user keyword ontology mapping;

identifying a second spoken query within the audio data input that is subsequent in time to the first spoken query and is distinguished from the first query by recognizing at least one non-verbal cue associated with the audio data input, wherein the at least one non-verbal cue comprises a time elapsed between the first spoken query and the second spoken query, and a user's motion activity relative to a programmable device comprising the processor during a time between the first spoken query and the second spoken query;

determining whether the second spoken query is directed to the initial topic or to a new topic that is different from the initial topic, as a function of mappings of the at least one keyword extracted from the first query to at least one keyword extracted from the second query and to the at least one non-verbal cue within the user ontology mapping; and determining that the second spoken query is directed to the new topic in response to determining that the user's motion activity indicates motion away from progressing toward a geographic reference point of a result that satisfies the first spoken query.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the identifying the initial topic, identifying the second spoken query within the audio data input that is subsequent in time to the first spoken query and is distinguished from the first query by recognizing the at least one non-verbal cue associated with the audio data input, determining whether the second spoken query is directed to the initial topic of the first spoken query or to a new topic that is different from the initial topic, and determining that the second spoken query is directed to the new topic in response to determining that the user's motion activity indicates the motion away from progressing toward the geographic reference point of the result that satisfies the first spoken query.

3. The method of claim 1, further comprising executing on the processor the steps of:
generating a response to the second spoken query that satisfies:
the initial topic, in response to determining that the second spoken query is directed to the initial topic;
the new topic, in response to determining that the second spoken query is directed to the new topic and is independent of the initial topic; and
the initial topic and the new topic, in response to determining that the second spoken query is directed to the new topic within a context of the initial topic.

4. The method of claim 3, further comprising:
determining that the second spoken query is directed to the new topic in response to determining that the time elapsed between the first spoken query and the second spoken query is in excess of a threshold time period for topic continuity.

5. The method of claim 4, further comprising:
in response to determining that the time elapsed between the first and second spoken queries is shorter than a threshold contextual continuity time period, generating the response to the second spoken query to satisfy the new topic and the initial topic of the first query.

6. The method of claim 1,
further comprising:
determining that the second spoken query is directed to the new topic in response to determining that a gaze orientation of the user during the second spoken query is different from an initial gaze orientation during the first spoken query.

7. The method of claim 1, wherein the at least one non-verbal cue comprises a user's facial expression detected during a time between the first spoken query and the second spoken query; and
the method further comprising:
determining that the second spoken query is directed to the new topic in response to determining that the user's facial expression during the time between the first spoken query and the second spoken query is selected from the group consisting of a frown, a scowl and a grimace.

8. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
identifies an initial topic of a first spoken query within an audio data input from a user that is mapped to at least one keyword extracted from the first spoken query within a user keyword ontology mapping;
identifies a second spoken query within the audio data input that is subsequent in time to the first spoken query and is distinguished from the first query by recognizing at least one non-verbal cue associated with the audio data input, wherein the at least one non-verbal cue comprises a time elapsed between the first spoken query and the second spoken query, and a user's motion activity relative to a programmable device comprising the processor during a time between the first spoken query and the second spoken query;
determines whether the second spoken query is directed to the initial topic or to a new topic that is different from the initial topic, as a function of mappings of the at least one keyword extracted from the first query to at least one keyword extracted from the second query and to the at least one non-verbal cue within the user ontology mapping; and
determines that the second spoken query is directed to the new topic in response to determining that the user's motion activity indicates motion away from progressing toward a geographic reference point of a result that satisfies the first spoken query.

9. The system of claim 8, wherein the processor executes the program instructions stored on the computer-readable storage medium via the computer readable memory and thereby further:
generates a response to the second spoken query that satisfies:
the initial topic, in response to determining that the second spoken query is directed to the initial topic;
the new topic, in response to determining that the second spoken query is directed to the new topic and is independent of the initial topic; and
the initial topic and the new topic, in response to determining that the second spoken query is directed to the new topic within a context of the initial topic.

10. The system of claim 9, wherein the processor executes the program instructions stored on the computer-readable storage medium via the computer readable memory and thereby further determines that the second spoken query is directed to the new topic in response to determining that the time elapsed between the first spoken query and the second spoken query is in excess of a threshold time period for topic continuity.

11. The system of claim 10, wherein the processor executes the program instructions stored on the computer-readable storage medium via the computer readable memory and thereby further:
in response to determining that the time elapsed between the first and second spoken queries is shorter than a threshold contextual continuity time period, generates the response to the second query to satisfy the new topic and the topic of the first query.

12. The system of claim 9,
wherein the processor executes the program instructions stored on the computer-readable storage medium via the computer readable memory and thereby determines that the second spoken query is directed to the new topic in response to determining that a gaze orientation of the user during the second spoken query is different from an initial gaze orientation during the first spoken query.

13. The system of claim 9, wherein the at least one non-verbal cue comprises a user's facial expression detected during a time between the first spoken query and the second spoken query; and
wherein the processor executes the program instructions stored on the computer-readable storage medium via the computer readable memory and thereby determines that the second spoken query is directed to the new topic in response to determining that the user's facial expression during the time between the first spoken query and the second spoken query is selected from the group consisting of a frown, a scowl and a grimace.

14. A computer program product for detecting shifts in topics in computer implemented speech recognition processes as a function of mapping keywords to non-verbal cues, the computer program product comprising:
a computer readable storage medium having computer readable program code embodied therewith, wherein the computer readable storage medium is not a transitory signal per se, the computer readable program code comprising instructions for execution by a processor that cause the processor to:
identify an initial topic of a first spoken query within an audio data input from a user that is mapped to at least one keyword extracted from the first spoken query within a user keyword ontology mapping;
identify a second spoken query within the audio data input that is subsequent in time to the first spoken query and is distinguished from the first query by recognizing at least one non-verbal cue associated with the audio data input, wherein the at least one non-verbal cue comprises a time elapsed between the first spoken query and the second spoken query, and a user's motion activity relative to a programmable device comprising the processor during a time between the first spoken query and the second spoken query;
determine whether the second spoken query is directed to the initial topic or to a new topic that is different from the initial topic, as a function of mappings of the at least one keyword extracted from the first query to at least one keyword extracted from the second query and to the at least one non-verbal cue within the user ontology mapping; and
determine that the second spoken query is directed to the new topic in response to determining that the user's motion activity indicates motion away from progressing toward a geographic reference point of a result that satisfies the first spoken query.

15. The computer program product of claim 14, wherein the computer readable program code instructions for execution by the processor further cause the processor to:
generate a response to the second spoken query that satisfies:
the initial topic, in response to determining that the second spoken query is directed to the initial topic;
the new topic, in response to determining that the second spoken query is directed to the new topic and is independent of the initial topic; and
the initial topic and the new topic, in response to determining that the second spoken query is directed to the new topic within a context of the initial topic.

16. The computer program product of claim 15, wherein the computer readable program code instructions for execution by the processor further cause the processor to determine that the second spoken query is directed to the new topic in response to determining that the time elapsed between the first spoken query and the second spoken query is in excess of a threshold time period for topic continuity.

17. The computer program product of claim 15, wherein the computer readable program code instructions for execution by the processor further cause the processor to, in response to determining that the time elapsed between the first and second queries is shorter than a threshold contextual continuity time period, generate the response to the second query to satisfy the new topic and the topic of the first query.

18. The computer program product of claim 15,
wherein the computer readable program code instructions for execution by the processor further cause the processor to determine that the second spoken query is directed to the new topic in response to determining that a gaze orientation of the user during the second spoken query is different from an initial gaze orientation during the first spoken query.

* * * * *